UNITED STATES PATENT OFFICE.

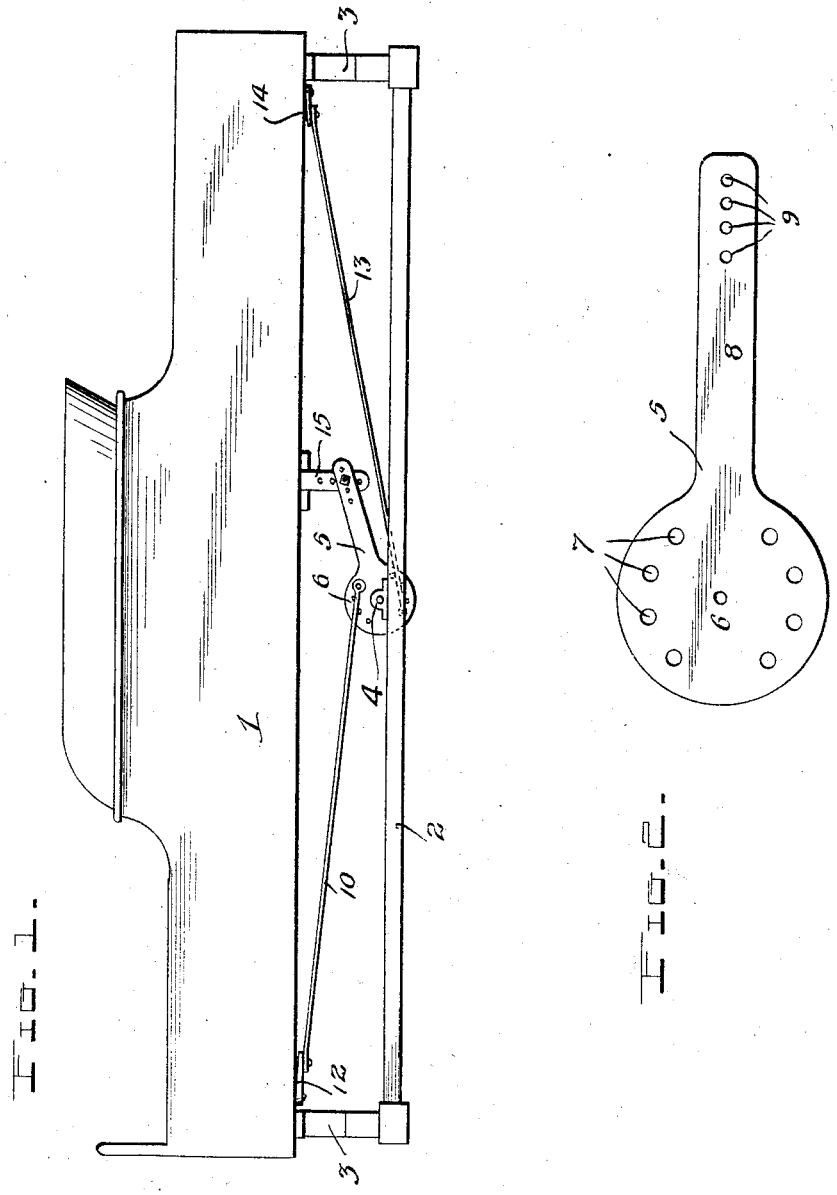

JOSEPH C. MORTON, OF ELDORADO SPRINGS, MISSOURI, ASSIGNOR OF ONE-HALF TO O. P. CASSITY, OF ELDORADO SPRINGS, MISSOURI.

VEHICLE-BODY BRACE.

No. 866,730.  Specification of Letters Patent.  Patented Sept. 24, 1907.

Application filed April 11, 1907. Serial No. 367,649.

*To all whom it may concern:*

Be it known that I, JOSEPH C. MORTON, a citizen of the United States, residing at Eldorado Springs, in the county of Cedar and State of Missouri, have invented certain new and useful Improvements in Vehicle-Body Braces; and I do declare the following to be a full, clear, and exact description of the invention, such as will enable others skilled in the art to which it appertains to make and use the same.

This invention relates to improvements in braces for vehicle bodies.

The object of the invention is to provide a brace adapted to be applied to the running gear and body of a vehicle to prevent the endwise movement of the body and the consequent strain upon the springs when the vehicle is suddenly started or stopped.

With this object in view, the invention consists of certain novel features of construction, combination and arrangement of parts as will be more fully described, and particularly pointed out in the claims.

In the accompanying drawings, Figure 1 represents a side view of a vehicle body with the wheels removed, showing the application of the invention thereto; and Fig. 2 is a detail view of the brace connecting and operating lever.

Referring more particularly to the drawings, 1 denotes the vehicle body; 2 denotes the reach, 3 denotes the front and rear springs which connect the vehicle body to the reach and running gear. Pivotally mounted upon the reach in suitable bearing brackets, 4, substantially midway between the opposite ends of the vehicle body, is a brace operating lever, 5, said lever comprising a circular head, 6, in which is formed a series of bolt holes, 7, and a stem or handle, 8, in which is formed a series of bolt holes, 9.

Adapted to be bolted or otherwise detachably connected to the head 6 of the lever 5 is a forwardly projecting brace rod, 10, the opposite or outer end of which is connected to a flat spring, 12, which in turn is connected to the underside of the vehicle body to permit said body to move up or down.

Bolted or otherwise detachably connected to one of the bolt holes 7 on the opposite side of the head 6, of the lever, is a rearwardly projecting brace rod, 13, the outer end of which is connected to a spring, 14, which is secured to the underside of the vehicle body adjacent to the rear end thereof. The stem or handle of the lever is connected to the lower end of a fastening bar, 15, the upper end of which is adapted to be bolted or otherwise connected to the vehicle body to hold the lever in a locked or operative position. By providing the series of holes, 7 and 9 in the head and stem of the lever, the brace rods and fastening bar may be adjustably connected thereto to provide for the lengthening or shortening of the same.

In operation, after the brace rods have been connected to the head of the lever at the desired point, the handle or stem of the lever is swung downwardly and rearwardly to the position shown in Fig. 1 of the drawings, thereby drawing the brace rods tight, after which said stem or handle is locked in an operative position by means of the fastening bar, 15. The arrangement and connection of the brace rods 10 and 13 with the vehicle body, will prevent any longitudinal movement of the same, thus relieving the springs 3 of any strain which might be caused by the sudden stopping or starting of the vehicle which tends to throw the body forward or rearward. The arrangement of the brace rods is such that all slack will be taken up, thus preventing the rattling or noise caused by the loose connection of the vehicle body. The connection of the brace rods with the vehicle body does not interfere with the up and down movement of the same with the springs.

From the foregoing description, taken in connection with the accompanying drawings, the construction and operation of the invention may be readily understood without requiring a more extended explanation.

Various changes in the form, proportions and minor details of construction may be resorted to without departing from the principle or sacrificing any of the advantages of this invention as defined in the appended claims.

Having thus fully described my invention, what I claim as new and desire to secure by Letters-Patent, is:

1. A vehicle body brace, comprising an operating or tightening lever, front and rear brace rods connected at their outer ends to the vehicle body, means to adjustably connect the inner ends of said rods to said lever, and a locking bar to secure the lever in an operative position, substantially as described.

2. A vehicle body brace, comprising a pivotally mounted operating lever consisting of a head and a stem, each having a series of bolt holes formed therein, front and rear brace rods having a spring connection at their outer ends to the underside of the vehicle body, bolts to adjustably connect the opposite ends of said rods with one of the bolt holes in said head of the operating lever, and means to lock said lever in an operating position.

3. A vehicle body brace, comprising a pivotally mounted operating lever consisting of a head and a stem, each having a series of bolt holes formed therein, front and rear brace rods having a spring connection at their outer ends to the underside of the vehicle body, bolts to adjustably connect the opposite ends of said rods with one of the bolt holes in said head of the operating lever, and a locking bar adapted to be adjustably connected in one of the bolt holes in the stem of the lever and connected at its opposite end to the vehicle body, substantially as described.

4. A vehicle body brace, comprising a bearing bracket secured to the reach of the vehicle running gear, an operating lever pivotally mounted in said bracket, said lever comprising a circular head having formed therein a series of bolt holes and a rearwardly projecting stem or handle having formed therein a series of bolt holes, front and rear brace rods having a spring connection at their outer ends with the underside of the vehicle body and adapted to be adjustably secured in one of the series of holes in the head of said lever, and a locking bar adapted to be adjustably connected to one of the series of holes in said stem of the lever, and to be connected at its opposite end to the vehicle body to lock said lever in an operative position, substantially as described.

In testimony whereof I have hereunto set my hand in presence of two subscribing witnesses.

JOSEPH C. MORTON.

Witnesses:
O. P. CASSITY,
B. F. CLARK.